United States Patent [19]

Carithers

[11] 3,856,708

[45] Dec. 24, 1974

[54] ALUMINA CATALYST SUPPORT

[75] Inventor: Val G. Carithers, Little Rock, Ark.

[73] Assignee: Reynolds Metals Company, Richmond, Va.

[22] Filed: Apr. 10, 1972

[21] Appl. No.: 242,748

[52] U.S. Cl. .............................................. 252/463
[51] Int. Cl. ............................................ B01j 11/06
[58] Field of Search ...................... 252/463, 477 R

[56] References Cited
UNITED STATES PATENTS

| | | | |
|---|---|---|---|
| 2,092,449 | 9/1937 | Fuchs | 252/463 X |
| 3,223,483 | 12/1965 | Osment | 252/463 X |
| 3,361,682 | 1/1968 | Keith et al. | 252/477 R |
| 3,392,125 | 7/1968 | Kelly et al. | 252/461 |
| 3,397,154 | 8/1968 | Talsma | 252/463 |
| 3,679,605 | 7/1972 | Sanford | 252/463 |

Primary Examiner—Daniel E. Wyman
Assistant Examiner—W. J. Shine
Attorney, Agent, or Firm—Glenn, Palmer, Lyne & Gibbs

[57] ABSTRACT

In the manufacture of an alumina catalyst support, activated alumina is admixed with a binder such as cellulose ether and a filler material such as wood flour, with sufficient water to form a thick paste, which is extruded and cut into pellets, dried, rehydrated, and finally calcined. A catalyst support is provided having a high degree of macropore content, particularly as regards the proportion of total pore volume contributed by pores larger than 3,000 angstrom units.

10 Claims, No Drawings

ALUMINA CATALYST SUPPORT

BACKGROUND OF THE INVENTION

The present invention relates to an alumina catalyst support and to the method of its preparation, and particularly to an alumina catalyst support adapted for use in so-called catalytic mufflers employed for the conversion of automotive exhaust gases to less polluting or nonpolluting forms.

It has been well established that one of the primary sources of air pollution and smog formation comprises exhaust gases emitted from various types of internal combustion engines. These exhaust gases contain, in varying proportions, such substances as unburned hydrocarbons, nitrogen oxides, ozone, aldehydes, sulfur dioxide, carbon monoxide, and lead compounds.

Among the various means which have been proposed for reducing or eliminating these undesirable emissions have been containers containing suitable conversion catalysts to be connected to the exhaust system of the engine, commonly known as catalytic mufflers. The containers, which are relatively small in size owing to vehicle space limitations, are filled with catalyst materials in the form of cylinders, balls, rings, and the like, of carrier material, impregnated with a suitable catalyst. The carrier material is usually a metal oxide, examples of which include alumina, silica, titanium oxide, magnesium oxide, and the like. The catalyst itself is conventionally a metal salt, such as a salt of copper, manganese, vanadium, platinum, cobalt, or molybdenum, the choice depending upon the type of conversion which is to take place. In actual practice the conversion is usually an oxidation of the exhaust gas components. The catalyst carrier most widely used is alumina, and it is this material with which the present invention is chiefly concerned. Typical forms of catalytic mufflers are shown, for example, in U.S. Pat. Nos. 2,772,147 and 3,438,721.

As far as the catalyst itself is concerned, it must possess in addition to a high degree of efficiency for the conversion to be made, e.g. oxidation, various physical characteristics imposed by the special conditions under which it is used. Thus the catalyst carrier, being subjected to shocks and vibration arising from vehicular motion, and to pressure impulses from the engine, and to elevated temperatures possessed by the exhaust gases, must possess, in addition to a porous structure, high mechanical strength, resistance to abrasion and crushing, and stability toward heat.

The efficiency of an automotive exhaust gas conversion catalyst, however, involves a number of requirements which arise from the special conditions under which such a catalyst must function. The first consideration is that only a small volume of catalyst is available, located in a confined space, and totalling perhaps 6 pounds. The catalyst bed must become heated to the effective conversion temperature, by the exhaust gases, in a very short time, within the first three to four minutes of engine operation, to minimize air pollution during the engine warm-up period, during which little or no conversion takes place. These conditions are in contrast to those present in large scale industrial chemical or petrochemical catalytic reactions of oxidation, hydroforming, cracking, hydrogenation, and the like, where large fixed catalyst beds are employed, and bed warm-up time does not present a serious problem, and the residence time of the reactants in contact with the catalyst bed may be maintained as long as desirable. Where fluidized bed catalysts are employed, the necessary turbulence may also be readily maintained. It was early recognized in this area that the surface area of the catalyst was an important factor in efficiency of conversion, and that it was desirable to have present a high surface area in the form of micropores, having an average diameter of the order of about 50 to 300 angstrom units.

However, in the field of exhaust gas conversion, the art soon recognized that, in the absence of available turbulence to promote contact, and in view of the brief residence time of exposure, a surface area of the catalyst of a different magnitude and kind was needed. The catalyst pores had to be larger, to avoid plugging by particulates in the gas stream, and also to provide low bulk density characteristics in the catalyst body itself. At the same time, the high mechanical strength features and the resistance to abrasion and crushing had to be preserved. The emphasis accordingly shifted from micropore sizes to macropores, meaning thereby, pore sizes ranging upward from about 600 to 700 angstrom units, to perhaps 2,000 to 3,000 depending upon the type of catalyst in question. It was also recognized, both in automotive and industrial catalysis, that the employment of macropore sizes of the magnitude indicated facilitated penetration of the metal salt catalyst into the interior porous structure of the support. An alumina catalyst support suitable for automotive exhaust gas conversion and having pores of a diameter greater than about 580 angstrom units is shown, for example, in U.S. Pat. No. 3,392,125, while an industrial catalyst support of macroporous alumina having some pores in the size range of 800 to 3,000 angstrom units is disclosed in U.S. Pat. No. 3,361,682. In the latter patent, however, the product described in example II (the only one using a crystalline alumina starting material rather than a gel) has a total pore volume of 0.63 ml/gm, of which the smaller pores (800 angstrom units and below) contribute 0.47 ml/gm, while only a minor portion of the remainder (.02 out of 0.16 ml/gm) is attributed to pores larger than 3000 angstrom units.

GENERAL DESCRIPTION OF THE INVENTION

In accordance with the present invention, there is provided a novel process for the manufacture of an alumina catalyst support having a high degree of macropore content, particularly as regards the proportion of total pore volume contributed by pores larger than 3,000 angstrom units.

An important distinguishing feature of the present invention is that its product consisting essentially of alumina exhibits a macroporous structure having a BET surface area on the order of 200 $m^2/gm$ (typically 150 – 250 $m^2/gm$) sufficient to provide a total pore volume of at least about 0.7 ml/gm, wherein a major portion of the total pore volume from pores larger than 700 angstrom units is contributed by pores which are larger than 3,000 angstrom units. Thus, for example, the larger than 700 angstrom units pores typically contribute at least about 0.3 ml/gm, of which at least as much as about 75% is associated with the larger than 3000 angstrom units pores. A catalyst support of this kind is particularly suited for the operation of a conversion catalyst for automotive exhaust gases, but may also be employed in industrial fixed or fluidized bed catalysis, or other fields of catalysis.

A suitable starting material for the process of the invention is alumina trihydrate, $Al_2O_3 \cdot 3H_2O$, such as that obtained by the Bayer sinter process from an aluminous ore.

In order to condition the alumina trihydrate particles for the subsequent processing steps, it is first desirable to effect an extensive reduction in the particle size of the trihydrate, to a value in which the bulk of the particles are in the range of 2–10 microns, with none greater than about 30 microns diameter. This may be accomplished by means of a ball mill or a fluid energy mill, such as the Majac mill, (manufactured by Majac, Inc., Pittsburgh, Pa.) described in U.S. Pat. Nos. 2,932,458 and 2,934,276, or the mill described in U.S. Pat. No. 2,672,296. A size reduction process of this type is disclosed in U.S. Pat. No. 3,361,682, as applied to alumina trihydrate for use as a catalyst support.

The finely divided alumina trihydrate is then activated in conventional manner by calcination at about 500° to 900°C, resulting in substantial dehydration rapidly to a level such that the loss on ignition of the calcined material is about 2–12 percent, preferably about 5 percent by weight. After calcining at about 500°–600°C. to an LOI of about 5 percent, for example, the resulting activated alumina is substantially amorphous, has a BET surface area on the order of 200–300 square meters per gram, is capable of adsorbing about 12–30 percent moisture at 80 percent relative humidity and is rehydratable in the presence of liquid water to at least about 30 percent boehmite content. The material is fluffy and that prepared by Majac grinding before activation has individual particles which are irregular and jagged in appearance.

A further aspect of the process of the present invention resides in the combination of steps whereby the activated alumina is prepared for extrusion and pelleting. The objective is to obtain catalyst support elements of the desired size and shape, such as generally cylindrical pellets having a diameter on the order of 0.100–0.125 inches and an l/D ratio of about 0.8–2, but, regardless of the particular configuration, characterized particularly by the macroporous structure described previously, and having a low bulk density less than 40 lbs. per cubic foot, preferably about 28–35 lbs. per cubic foot.

The pelleting operation comprises providing a mixture of the activated alumina with a finely divided filler material, eg. wood flour, and a small amount of a suitable lubricant binder, eg. cellulose ether, both of which are destroyed during subsequent calcination of the pellets. While wood flour and Methocel 90 HG 100 are the presently preferred ingredients, other combustible filler materials may be employed, including finely divided granular particulate micro-crystalline cellulose, available commercially under the designation "Avicel," as well as powdered paper pulp or finely divided plastics such as polypropylene. Other conventional lubricant-binder materials may also be used, subject only to compatability, convenience in handling, workability of the resulting paste mixture and elimination in the calcining operation. The essential function of the filler material is that it takes the place of a portion of the alumina in the binder-alumina combination, spacing the alumina particles, and facilitating the formation of the desirable macropores which could be obtained only with difficulty, if at all, by other means.

The proportion of Methocel binder employed in admixture with the activated alumina and the combustible filler material is relatively small, ranging from about 0.5 to about 5 parts for each 100 parts by weight of alumina. The proportion of wood flour filler material may range from about 2.5 to about 25 parts for each 100 parts by weight of alumina.

The paste mixture is extruded using any suitable type of extruder, so as to form solid or hollow cylinders, and cut into the desired lengths. The extrudates may then be dried at about 300°F. to set the binder and to harden the pellets to achieve sufficient strength for subsequent handling and processing.

The extrudates are then hydrothermally hardened by conventional treatment, either at atmospheric pressure of under autogenous pressure, whereby the pellets are rehydrated by conversion of the predominantly amorphous alumina to produce boehmite together with small amounts of bayerite forming a strong bond. Thus, for example, the pellets may be boiled in demineralized water at atmospheric pressure for about 10 to 72 hours, or digested in water under autogenous pressure at temperatures ranging from about 125°C. to about 150°C. for about 15 to 30 minutes. The resulting rehydrated pellets are then ready for calcination.

The final calcination treatment may be conducted at a temperature of about 400°–900°C. (typically about 500°–600°C.) in any suitable apparatus, such as a calcination furnace or a belt-type calciner, for a period sufficient to eliminate the filler and binder materials. The resulting product is essentially an amorphous alumina containing minor amounts of mixed eta-gamma phases, and having a LOI of about 1 to 5 percent.

Additional significant properties of the alumina catalyst support materials of the present invention are that the finished pellets typically have an apparent pellet density of about 0.7–1.0 gm/cc and a packed bulk density less than 40 lbs. per cubic foot, particularly about 28–35 lbs. per cubic foot in the case of generally cylindrical pellets of the size and configuration previously described; are resistant to crushing under a load not less than about 5 to 10 pounds; and exhibit not more than about 5 percent shrinkage on a volume basis after heating for 24 hours at about 1,800°F. Such properties render the materials especially suitable for automotive applications.

DESCRIPTION OF THE PREFERRED EMBODIMENTS

The following examples illustrate the presently preferred embodiments and practices of the invention, but are not to be considered as limiting:

EXAMPLE 1

The calcination unit used to prepare the initially activated alumina had a stainless steel standpipe through which hot combusted gases were passed while screw feeding ground alumina trihydrate into the pipe. The partially dehydrated alumina was collected in a cyclone dust collector.

Below are shown typical operating parameters (under substantially equilibrium conditions) as used to produce activated alumina suitable for purposes of the invention:

```
Average Column Temperature      - 990°F
Cyclone Product Temperature     - 510°F
System Gases Avg. Temperature   - 1950°F
Gas Velocity at Average         - 42 FPS
Fuel Rate                       - 2150 SCFH
Alumina Trihydrate Feed Rate    - ~1200 lbs./hr.
Product Rate                    - ~730 lbs./hr.
```

Properties of the resulting activated alumina and two different starting materials are described in Table I.

Approximately 1,500 lbs. of 5 × 7 mesh alumina supports were made by the following method. Here the activated alumina used was prepared from Hydrate B (cf. Table I) by the procedure described above.

Step 1: Mixing 1. 20.0 lbs. of activated alumina and 2.2 lbs. of wood flour were charged to a stainless steel Simpson mixmuller and mixed about 1 minute.

2. 7,000 ml of water at 50°F containing 10 grams NaOH were added to the muller while mixing. Mixing was continued a total time of 10 minutes.

3. Muller was stoped and 200 grams Methocel 90HG100 were added to the mix. Mixing was continued 5 minutes followed by addition of 500 ml water at 50°F. to the mix. An additional 10 minutes mixing was continued.

Step 2: Extrusion — Cutting — Storage — Screening

1. The soft, doughy mix was charged to a Loomis 2-inch inside diameter piston die and compacted. The mix was extruded therefrom through a multi-hole die having bores or openings of 0.120 inch diameter.

2. As the soft extrudates exited the die they were cut by means of a wire rotary cutter to lengths of from about 0.100 to about 0.350 inch and collected in either stainless steel or porcelain pans. Extrudates were allowed to stand for about 2 to about 4 hours after which they were placed in five 30-gallon buckets which were sealed or made air tight by covering with plastic sheets.

3. Extrudates were held in buckets from 24 to 48 hours then screened and collected as 5 × 7 mesh cylinders.

Step 3: Rolling — Drying — Rehydration

1. The 5 × 7 mesh screened cylinders were charged into a 55-gallon plastic drum enclosed in a steel drum and rolled 10-20 minutes to remove the jagged edges from the cylinders.

2. The rolled cylinders were then dried 16 hours at 300°F in a gas-fired, recirculating drying oven.

3. The dried cylinders were then placed in 55-gallon stainless steel drums; the drums were filled with water to completely immerse the cylinders.

4. Heat was applied to drums and the cylinders were thus boiled in water from 48 to 72 hours to effect rehydration of the alumina.

Step 4: Washing — Calcination — Screening

1. At the end of the rehydration period the water was drained from the drums by bottom pipe outlet and the rehydrated cylinders were given three volume displacement washes with 70°F water.

2. Washed cylinders were then placed in 20 × 16 × 2 inches stainless steel wire baskets (wire opening 8 mesh) to a depth of 1 inch.

3. Baskets were cross stacked to a height of from 6 to 10 baskets in a gas-fired periodic kiln. Typical kiln load was from 200 to 400 lbs. finished alumina support.

4. Kiln was then heated to 500°C in about 20 hours and held at 500° to 520°C for from 2½ to 3½ hours to calcine the cylinders. At the end of this time kiln gas and air were cut off and product was removed after 16 hours cooling.

5. Cooled product (temperature about 100°–105°C) was screened to 5 × 7 mesh; sealed in drums; analyzed.

Shown in the following Tables II and III are results of analyses on these products representing five separate calcinations of supports made by the previous manufacturing description.

TABLE I

|  | Hydrate A | Hydrate B |
|---|---|---|
| Loss on Ignition at 1000°C (%) | 34.70 | 34.68 |
| (Chemical Analysis After Ignition at 1000°C) | | |
| $Al_2O_3$ (%) | +99.70 | +99.70 |
| $Na_2O$ (%) | 0.18 | 0.19 |
| $SiO_2$ (%) | 0.01 | 0.01 |
| $Fe_2O_3$ (%) | 0.006 | 0.005 |
| CaO (%) | 0.002 | 0.002 |
| (Particle Size Distribution) | | |
| +30 Microns (%) | 0.2 | 0.3 |
| +20 Microns (%) | 2.8 | 5.4 |
| +15 Microns (%) | 9.0 | 16.3 |
| +10 Microns (%) | 22.1 | 33.3 |
| +5 Microns (%) | 52.9 | 63.3 |
| +3 Microns (%) | 74.5 | 81.7 |
| +2 Microns (%) | 87.4 | 91.7 |
| +1 Micron (%) | 97.7 | 99.5 |
| +0.5 Micron (%) | 100.0 | 100.0 |
| ANALYSES OF ACTIVATED ALUMINA RECOVERED | | |
| Loss on Ignition at 1000°C (%) | 4.9 | 3.0 |
| Surface Area (M²/g) | 280 | 240 |
| Alumina Crystal Phases Present | * | * |

* None detected by x-ray diffraction; considered amorphous.

TABLE II

|  | Products of Firing Number | | | | |
|---|---|---|---|---|---|
|  | 1 | 2 | 3 | 4 | 5 |
| Loss on Ignition at 1000°C (%) | 3.9 | 4.9 | 3.9 | 4.4 | 3.9 |
| $Na_2O$ (%) | 0.064 | 0.097 | 0.064 | 0.059 | 0.063 |
| $SiO_2$ (%) | 0.030 | 0.028 | 0.022 | 0.030 | 0.031 |
| $Fe_2O_3$ (%) | 0.017 | 0.015 | 0.018 | 0.015 | 0.020 |
| CaO (%) | 0.011 | 0.012 | 0.012 | 0.010 | 0.010 |
| $Al_2O_3$ (%) | +99.75 | +99.75 | +99.75 | +99.75 | +99.75 |
| BET Surface Area (M²/g) | 190 | 210 | 185 | 225 | 185 |
| Apparent Density (g/cc) | 0.89 | 0.88 | 0.87 | 0.87 | 0.87 |

TABLE II—Continued

|  | Products of Firing Number | | | | |
|---|---|---|---|---|---|
|  | 1 | 2 | 3 | 4 | 5 |
| Absolute Density (g/cc) | 3.25 | 3.23 | 3.24 | 3.24 | 3.24 |
| Total Pore Volume (Ml/g) | 0.814 | 0.830 | 0.840 | 0.832 | 0.840 |
| Packed Bulk Density (lbs/ft$^3$) | 32 | 33 | 32 | 32 | 32 |
| $^2$Crush Strength (Total load in lbs.) | 9.8 | 10.1 | 9.2 | 8.1 | 9.3 |
| Mean Diameter of Crush Specimens (inch) | 0.124 | 0.124 | 0.124 | 0.122 | 0.124 |
| Mean Length of Crush Specimens (inch) | 0.220 | 0.217 | 0.250 | 0.240 | 0.219 |

$^1$Values on 0% loss on ignition basis
$^2$Using Tinius-Olsen MOR Tester at 30 lbs./min. load rate perpendicular to cylinder diameter

TABLE III

Pore Analyses via Mercury Porosimeter (cumulative pore volume in ml/g)

| Diameter (Microns) | Products of Firing Number | | | | |
|---|---|---|---|---|---|
|  | 1 | 2 | 3 | 4 | 5 |
| +10 | 0.025 | 0.031 | 0.029 | 0.028 | 0.029 |
| +5 | 0.047 | 0.063 | 0.052 | 0.060 | 0.052 |
| +3 | 0.074 | 0.082 | 0.084 | 0.092 | 0.084 |
| +2 | 0.105 | 0.107 | 0.111 | 0.120 | 0.111 |
| +1.5 | 0.128 | 0.126 | 0.131 | 0.139 | 0.131 |
| +1 | 0.152 | 0.151 | 0.157 | 0.170 | 0.157 |
| +0.5 | 0.211 | 0.205 | 0.212 | 0.219 | 0.212 |
| +0.3 | 0.282 | 0.246 | 0.259 | 0.271 | 0.259 |
| +0.1 | 0.321 | 0.312 | 0.323 | 0.328 | 0.323 |
| +0.07 | 0.333 | 0.327 | 0.338 | 0.343 | 0.338 |
| +0.05 | 0.346 | 0.349 | 0.357 | 0.349 |  |
|  | 0.340 |  |  |  |  |
| +0.035 | 0.363 | 0.359 | 0.367 | 0.377 | 0.367 |
| −0.035 | 0.451 | 0.471 | 0.473 | 0.455 | 0.503 |

All above products had a volume shrinkage of less than 1% after heating at 1800°F for 24 hours.
BET Surface Area, Pore Volume and Pore Diameter determinations by the method of S. Branner et al., J. American-Canadian Chem. Soc. 1938 (Vol. 60).
Pore volume distribution, apparent density and total pore volume by Aminco-Winslow Instruction #598 (1960); cf. Winslow & Shapiro, ASTM Bulletin (Feb. 1959).

EXAMPLE 2

The following charges were made to a stainless steel sigma blade mixer. Materials were mixed 15 minutes then extruded through a single hole die of 0.115 inch diameter. Extrusions were cut by means of an automatic wire-type cutter to lengths of from 0.1 to 0.25 inch. The extruder used was a Loomis piston-type having a 2-inch barrel. The green extrudates were tumbled via a centrifuge then dried 24 hours at 300°F and rehydrated by boiling in ammoniacal water for 48 hours. Rehydrated extrudates were then placed in wire baskets and heated to 600°C in 3 hours and soaked at 600°C for 1 hour. All heating was done in an electric furnace. The calcined extrudates were screened to 6 × 7 mesh and analyzed.

| Extrusion Charge | Grams Material Mixed for Extrusion | | | | Average Extrusion Pressure (Tons) |
|---|---|---|---|---|---|
|  | Activated Alumina from Hydrate A | Wood Flour | Methocel 90HG100 | Water |  |
| A | 1500 | 0 | 60 | 900 | 2–2.5 |
| B | 1000 | 50 | 30 | 650 | 3.5–4 |
| C | 1000 | 100 | 20 | 760 | 2.5–3 |
| D | 1500 | 250 | 30 | 1125 | — |

COMPARISON OF ALUMINA SUPPORTS MADE WITH VARIOUS AMOUNTS OF FILLER

|  | Finished Supports | | | |
|---|---|---|---|---|
|  | A | B | C | D |
| Loss on Ignition at 1000°C (%) | 1.6 | 2.3 | 1.4 | 2.9 |
| Apparent Density (g/cc) | 1.06 | 0.98 | 0.98 | 0.79 |
| Absolute Density (g/cc) | 3.21 | 3.33 | 3.36 | 3.30 |
| Total Pore Volume (ml/g) | 0.636 | 0.723 | 0.728 | 0.963 |
| Packed Bulk Density (Lbs/Ft.$^3$) | 41.6 | 38.2 | 36.0 | 29.5 |
| Crush Strength (Total Load in Lbs.) | 27.1 | 14.3 | 11.4 | 4.7 |
| Average Crush Test Specimen Dia. (In.) | 0.114 | 0.116 | 0.113 | 0.102 |
| Pore Diameter (Microns) | Pore Volume (ml/g) | | | |
| +10 | 0.010 | 0.022 | 0.018 | .043 |
| +5 | 0.018 | 0.044 | 0.029 | .103 |
| +3 | 0.023 | 0.078 | 0.059 | .176 |
| +2 | 0.026 | 0.110 | 0.124 | .229 |
| +1.5 | 0.031 | 0.135 | 0.159 | .263 |
| +1 | 0.039 | 0.160 | 0.188 | .303 |
| +0.5 | 0.051 | 0.192 | 0.226 | .369 |
| +0.3 | 0.062 | 0.214 | 0.247 | .399 |
| +0.1 | 0.098 | 0.267 | 0.288 | .472 |
| +0.07 | 0.108 | 0.283 | 0.297 | .489 |
| +0.05 | 0.123 | 0.292 | 0.306 | .505 |
| +0.035 | 0.144 | 0.308 | 0.347 | .519 |
| −0.035 | 0.492 | 0.415 | 0.381 | 0.444 |

As the data indicates, by increasing the levels of filler in the extrusion mix one can reduce the bulk density of resultant supports as well as increase pore volumes at larger pore diameters.

EXAMPLE 3

EFFECT OF PARTICLE SIZE OF GROUND "ACTIVATED ALUMINA" ON SUPPORT PROPERTIES

Compared in the following table are two alumina supports. Both were made by similar methods but one product used the activated alumina prepared from Hydrate A while the other used the activated alumina from the coarser Hydrate B (both previously described).

Both products were extruded cylinders and the basic formulations used were:

|  | Support of Hydrate A | Support of Hydrate B |
|---|---|---|
| Activated Al₂O₃ (g) | 1500 | 1500 |
| Filler (wood flour) (g) | 250 | 250 |
| Methocel (g) | 30 | 30 |
| Water (g) | 1100–1150 | 1100–1150 |

| | 6 × 8 Mesh Finished Alumina Supports From | |
|---|---|---|
| | Hydrate A | Hydrate B |
| Loss on Ignition @ 100°C (%) | 2.9 | 3.9 |
| Crush Strength (total load lbs.) | 4.7 | 4.9 |
| Mean Dia. of Crush Specimens (inch) | 0.102 | 0.102 |
| Pack Bulk Density (lbs/ft³) | 29.5 | 33.5 |
| BET Surface Area (M²/g) | 200±10 | 200±10 |
| Apparent Density (g/cc) | 0.79 | 0.90 |
| Absolute Density (g/cc) | 3.30 | 3.26 |
| Total Pore Volume (ml/g) | 0.963 | 0.810 |

| Hg Porosimeter Data on Pores | | |
|---|---|---|
| Diameter (Microns) | Pore Volume (ml/g) | |
| +10 | 0.043 | 0.032 |
| +5 | 0.103 | 0.046 |
| +3 | 0.176 | 0.066 |
| +2 | 0.229 | 0.092 |
| +1.5 | 0.263 | 0.114 |
| +1 | 0.303 | 0.140 |
| +0.5 | 0.369 | 0.205 |
| +0.3 | 0.399 | 0.257 |
| +0.1 | 0.472 | 0.331 |
| +0.07 | 0.489 | 0.347 |
| +0.05 | 0.505 | 0.361 |
| +0.035 | 0.519 | 0.375 |
| −0.035 | 0.444 | 0.435 |

EXAMPLE 4

The three products (finished alumina supports 6 × 8 mesh) described in Table IV were made from the following formulation:

1500g activated alumina from Hydrate A
250g filler (wood flour)
30g Methocel binder All processing conditions were carefully controlled: mixing time; drying time; rehydration time; calcination conditions, etc. All products were formed by extruding through a Loomis piston extruder. The principal difference in processing was that more water was added to each succeeding batch so as to lower extrusion pressure. Product 1 was made using less extrusion mix water than Product 2, hence higher extrusion pressures, and Product 3 was made using more water than Product 2.

It may be seen from the data reported that lower extrusion pressures ultimately yield finished supports of lower bulk density; higher pore volume and larger diameter pores of high pore volume; and lower apparent density (or higher porosity).

TABLE IV

| | Finished Supports | | |
|---|---|---|---|
| | Product 1 | Product 2 | Product 3 |
| Loss on Ignition @ 1000°C (%) | 2.6 | 2.9 | 2.2 |
| BET Surface Area (M²/g) | 200±10 | 200±10 | 200±10 |
| Apparent Density (g/cc) | 0.84 | 0.79 | 0.71 |
| Absolute Density (g/cc) | 3.30 | 3.30 | 3.30 |
| Total Pore Volume (ml/g) | 0.887 | 0.963 | 1.105 |
| Packed Bulk Density (lbs/ft³) | 33 | 29.5 | 26.5 |
| Crush Strength (total load lbs.) | 5.6 | 4.7 | 5.5 |
| Mean Dia. of Crush Specimens (inch) | 0.092 | 0.102 | 0.098 |

| Hg Porosimeter Data on Pores | | | |
|---|---|---|---|
| Diameter (Microns) | Pore Volume (ml/g) | | |
| +0.5 | 0.444 | 0.369 | 0.450 |
| +0.3 | 0.473 | 0.399 | 0.479 |
| +0.1 | 0.501 | 0.472 | 0.528 |
| +0.07 | 0.509 | 0.489 | 0.540 |
| +0.05 | 0.513 | 0.505 | 0.557 |
| +0.035 | 0.521 | 0.519 | 0.577 |
| −0.035 | 0.366 | 0.444 | 0.528 |

The binder-lubricant material (eg. cellulose ether) is preferably one which exhibits inverse solubility, i.e. is readily dissolved in cool water (50°F.) used for mixing, as previously described, but is less soluble in hot water so that it resists extraction from the shaped mixture during rehydration treatment. The use of cool water also helps to counteract heat of reaction as water is added, thereby avoiding premature rehydration of the activated alumina.

Although presently preferred embodiments and practices of the invention have been described, it will be apparent that the invention may be otherwise variously embodied and practiced within the scope of the following claims.

What is claimed is:

1. An alumina catalyst support consisting essentially of activated alumina having an LOI of about 1 to 5 percent, a surface area on the order of 200 m²/gm, and a total pore volume of at least about 0.7 ml/gm, wherein a major portion of the pore volume associated with pores larger than 700 angstrom units is contributed by pores which are larger than 3,000 angstrom units, and in which said pores larger than 700 angstrom units contribute a pore volume of at least about 0.3 ml/gm.

2. The product of claim 1 in which approximately 75 percent of the pore volume from pores larger than 700 angstrom units is contributed by pores which are larger than 3,000 angstrom units.

3. Catalyst support material comprising pellets of activated alumina having an LOI of about 1 to 5 percent, a surface area on the order of 200 m²/gm and a total pore volume of at least about 0.7 ml/gm, including a pore volume of at least about 0.3 ml/gm associated with pores larger than 700 angstrom units of which a major portion is contributed by pores that are larger than 3,000 angstrom units, said pellets having an apparent pellet density of about 0.7–1.0 gm/cc.

4. The material of claim 3, comprising pellets of generally cylindrical configuration having a maximum diameter on the order of 0.100–0.125 inch and an l/D ratio of about 0.8 to 2; and having a packed bulk density of about 28–35 lbs. per cubic foot.

5. The material of claim 4 wherein said pellets exhibit not more than about 5 percent shrinkage on a volume basis after heating for 24 hours at about 1,800°F.

6. The material of claim 5 wherein said pellets are further characterized by resistance to crushing under a load of about 5 to 10 pounds.

7. The method of making an alumina catalyst support which comprises calcining alumina trihydrate at about 500°–900°C. to obtain activated alumina having an LOI of about 2 to 12 percent, providing a mixture of the activated alumina, about 0.5 parts to about 5 parts of cellulose ether and about 2.5 parts to about 25 parts of wood flour for each 100 parts by weight of alumina, with sufficient water to form a semi-plastic paste, extruding said paste, cutting the extrudate into pellets, and drying, rehydrating and calcining said pellets at about 400°–900°C. to activate the rehydrated alumina.

8. The method of claim 7 in which said mixture comprises activated alumina prepared by grinding alumina trihydrate prior to activating the ground material, said grinding being effective to obtain particles the bulk of which are in the size range of about 2 to 10 microns.

9. The method of claim 7 including calcining said pellets to an LOI of about 1 to 5 percent.

10. In the art of processing activated alumina to form an article having a macroporous structure, the improvement which comprises shaping said article from a mixture of activated alumina, from about 2.5 to about 25 parts by weight of a combustible filler material and from about 0.5 to about 5 parts by weight of a temporary binder of inversely soluble cellulose ether for each 100 parts of alumina, treating the shaped mixture to effect rehydration bonding of the alumina, and calcining the bonded article at about 400°–900°C. to an LOI of about 1 to 5 percent; said binder being readily dissolved in cool water (50°C.) yet resisting extraction from the shaped mixture when immersed in hot aqueous solution at substantially the boiling point of water during the rehydration treatment; said calcining being effective to eliminate the binder and filler materials.

* * * * *